United States Patent
Rumsey (10) Patent No.: US 10,659,438 B2
(45) Date of Patent: May 19, 2020

(54) POLICY BASED MESSAGE CRYPTOGRAPHIC EXPIRY

(71) Applicant: INTERNATIONAL BUSINESS MACHINES CORPORATION, Armonk, NY (US)

(72) Inventor: Jonathan L. Rumsey, Hursley Park (GB)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 14/795,031

(22) Filed: Jul. 9, 2015

(65) Prior Publication Data

US 2017/0063983 A1    Mar. 2, 2017

(51) Int. Cl.
*H04L 29/06*     (2006.01)
*H04L 9/32*      (2006.01)
*H04L 12/24*     (2006.01)
*H04L 12/58*     (2006.01)

(52) U.S. Cl.
CPC ........ *H04L 63/0435* (2013.01); *H04L 9/3268* (2013.01); *H04L 41/0806* (2013.01); *H04L 51/12* (2013.01); *H04L 51/18* (2013.01); *H04L 63/20* (2013.01); *H04L 51/14* (2013.01); *H04L 63/068* (2013.01)

(58) Field of Classification Search
CPC .................................................. G06Q 10/107
See application file for complete search history.

(56) References Cited

U.S. PATENT DOCUMENTS

| | | | |
|---|---|---|---|
| 7,333,616 B1* | 2/2008 | Brettle | H04L 9/0894 380/277 |
| 8,769,492 B2 | 7/2014 | Speare et al. | |
| 8,788,812 B2 | 7/2014 | Brown et al. | |
| 8,938,074 B2 | 1/2015 | Drucker | |
| 9,590,885 B1* | 3/2017 | Leonard | H04L 43/10 |
| 2006/0274856 A1* | 12/2006 | Dunn | H04K 1/00 375/316 |
| 2007/0016781 A1* | 1/2007 | Asokan | H04L 9/0869 713/173 |
| 2007/0150727 A1* | 6/2007 | Miyazawa | G06F 21/604 713/158 |
| 2007/0156783 A1 | 7/2007 | Zbogar-Smith et al. | |
| 2008/0109448 A1* | 5/2008 | Aboel-Nil | G06Q 10/107 |

(Continued)

*Primary Examiner* — Oleg Survillo
*Assistant Examiner* — Christopher P Cadorna
(74) *Attorney, Agent, or Firm* — Heslin Rothenberg Farley & Mesiti P.C.; Robert Shatto, Esq.

(57) ABSTRACT

A method of managing messages in a messaging system, the method including: identifying a policy associated with the messaging system, the policy including directives associated with the privacy and integrity of messages; applying the policy to a message, the policy including configuration data that determines when the message should be expired; sending the message to the messaging system; using the configuration data to calculate the expiry of the message and passing the calculated expiry of the message to the messaging system; determining whether the expiry has been reached; responsive to the expiry being reached, sending a report message to the message producer; and responsive to the expiry not being reached, attempting to deliver the message to the message consumer.

10 Claims, 5 Drawing Sheets

(56) References Cited

U.S. PATENT DOCUMENTS

| | | | |
|---|---|---|---|
| 2010/0094809 A1* | 4/2010 | Consul | H04L 51/22 |
| | | | 707/662 |
| 2011/0196931 A1* | 8/2011 | Clagg | H04L 12/585 |
| | | | 709/206 |
| 2013/0036302 A1 | 2/2013 | Lord et al. | |
| 2013/0080763 A1* | 3/2013 | Lee | H04L 9/3231 |
| | | | 713/150 |
| 2013/0166665 A1 | 6/2013 | Robertson | |
| 2013/0198618 A1* | 8/2013 | Tanzer | G06F 21/604 |
| | | | 715/255 |
| 2014/0041013 A1 | 2/2014 | Bandini et al. | |
| 2014/0201527 A1* | 7/2014 | Krivorot | G06F 21/6209 |
| | | | 713/168 |
| 2015/0006893 A1 | 1/2015 | Dixon et al. | |
| 2015/0365358 A1* | 12/2015 | Strassner | H04L 51/00 |
| | | | 709/206 |
| 2016/0173286 A1* | 6/2016 | Gallagher | H04L 9/321 |
| | | | 713/156 |

* cited by examiner

132
MESSAGING POLICY

300
DIRECTIVES

302  EXPIRY OF PRODUCER's CERTIFICATE

304  EXPIRY OF INTENDED CONSUMER CERTIFICATE

306  "DROP DEAD" DATE

308  TIME PERIOD CALCULATED FROM TIME MESSAGE PRODUCED

310  TIME PERIOD CALCULATED FROM FIRST USE OF PRE-SHARED SYMMETRIC KEY

312  OTHER

320
DIRECTIVES

322  PRIVACY

324  INTEGRITY

POLICY BASED MESSAGE CRYPTOGRAPHIC EXPIRY

BACKGROUND

The present invention relates to the handling of digitally signed and/or encrypted message data, and more specifically to the policy based expiry of digitally signed and/or encrypted message data by a messaging provider.

Message data may be digitally signed using a digital signature. Such digital signatures typically have an expiry time after which they become invalid. Similarly, message data may be encrypted using a symmetric key. Such symmetric keys typically also have an expiry time after which they become inadequate. When a message consumer receiving such a signed or encrypted message tries to authenticate the message or to decrypt the message, it will find that the digital signature or the symmetric key has expired, meaning that it is not able to authenticate or to decrypt the message. The authentication or decryption by the message consumer of a message requires significant processing power and time, which is then wasted because the message cannot be authenticated or decrypted by the consumer of the message.

Expiry messages contain a period of time, for which they are valid, set by an application that puts the message onto a queue. The expiry time is a field in the message descriptor of a message which gets decremented as the message spends time on a queue. When a message is retrieved by a message consumer, prior to expiration, the expiry time represents the amount of time left from the original time specified. When a message's expiry time has elapsed, it becomes eligible for discard by the queue manager. The message is discarded when a browse or nonbrowse retrieve occurs on the message.

The concept of message expiry is already an established mechanism in the field of messaging. For example, in the IBM® WebSphere® MQ® product, a message producer can request that a message should cease to be valid after a set period of time. Policy based signed digital messaging is also an established technology as implemented by IBM WebSphere MQ Advanced Message Security. Error handling is implemented by the message consumer and is not an integral part of the messaging engine.

U.S. Pat. No. 8,769,492 B2 discloses that a message transfer agent scans stored messages to determine whether or not the content has expired. If the content has indeed expired the administrator may take steps to have the expired content deleted entirely, refreshed with more current content, or replace with a tombstone indicating that the original content has expired. The message sender elects to apply rights management protection to the message at the time of sending.

SUMMARY

According to an embodiment of the invention, a method is provided for managing messages in a messaging system, the messages being produced by a message producer for delivery to a message consumer, the method comprising: identifying a policy associated with said messaging system, said policy comprising directives associated with the privacy and/or integrity of said messages; applying said policy to a message, said policy comprising configuration data that determines when said message should be expired; sending said message from said message producer to said messaging system; calculating the expiry of said message using said configuration data and passing the calculated expiry of said message to said messaging system; determining whether said calculated expiry of said message has been reached; responsive to said expiry of said message being reached, sending a report message to said message producer; and responsive to said expiry of said message not being reached, attempting to deliver said message to said message consumer.

This provides the advantage that the cost of error handling an invalid signature or decryption key is not borne by the messaging consumer, who will also bear additional cost due to handling an encryption overhead.

In an embodiment, after calculating the expiry of said message, said message consumer requests said message and wherein said message is a next message.

In one embodiment, said identifying a policy associated with said message producer comprises identifying a policy name matching the name of one of a queue or a topic that said message producer is sending said message to. This provides the advantage that it is very easy to identify the appropriate policy with minimal overhead.

In an optional embodiment, said directives associated with the privacy and integrity of said messages comprise how said message producers and said message consumers securely exchange said messages, said directives including whether said messages must be digitally signed or encrypted.

In an advantageous embodiment, said configuration comprises one of the expiry of said message producer's certificate if signing the message data or the expiry of the intended message consumer's certificate if encrypting the message data. This provides the advantage that the message consumer does not have to process or to handle errors resulting from an expired certificate.

In an embodiment, said configuration comprises a fixed "drop dead" date configured by a messaging administrator. This embodiment is particularly advantageous when the data contained in the message has a finite date after which it is not useful. Typically, the "drop dead" date is not related to the certificate lifetime. For example, a project or contract that is intended to be complete by the end of a year, but a certificate that is used may be valid for multiple years.

In an embodiment, said configuration comprises one of a time period calculated from the time said message was produced or a time period calculated from the first use of a pre-shared symmetric key. This embodiment is particularly advantageous because after data has been encrypted the chance that the symmetric key used for the encryption could be discovered through a brute-force attack increases over time. Setting a time period calculated from the time the message was produced or a time period from the first use of a symmetric key and so was first 'available' to a malicious entity is useful in discarding the data from the messaging engine before a brute force attack becomes practical.

According to another embodiment of the invention, a messaging system for handling messages, comprises: a policy associated with said messaging system, said policy comprising directives associated with the privacy and integrity of said messages; a message producer which identifies a policy to be used and applies said policy to said message, said policy comprising configuration data that determines when said message should be deleted, said message intended for delivery to a message consumer and which sends said message to said messaging provider; and a messaging provider which uses said configuration data to calculate the expiry of said message, determines whether said calculated expiry of said message has been reached, responsive to said expiry of said message being reached, sends a report message to said message producer and responsive to said expiry of said message not being reached, attempts to deliver said message to said message consumer.

According to another embodiment of the invention, a computer program product for managing messages in a messaging system comprises: a computer readable storage medium having program instructions embodied therewith, the program instructions executable by a computer to cause the computer to: identify a policy associated with said messaging system, the policy comprising directives associated with the privacy and/or integrity of messages; apply said policy to a message, said policy comprising configuration data that determines when said message should be expired; sending said message from said message producer to said messaging system; calculating the expiry of said message using said configuration data and passing the calculated expiry of said message to said messaging system; determining whether said calculated expiry has been reached; responsive to said expiry of said message being reached, sending a report message to said message producer; and responsive to said expiry of said message not being reached, attempting to deliver said message to said message consumer.

BRIEF DESCRIPTION OF THE DRAWINGS

Embodiments of the present invention are described in more detail below, by way of example only, with reference to the accompanying drawings, in which.

DETAILED DESCRIPTION

Figure 1:
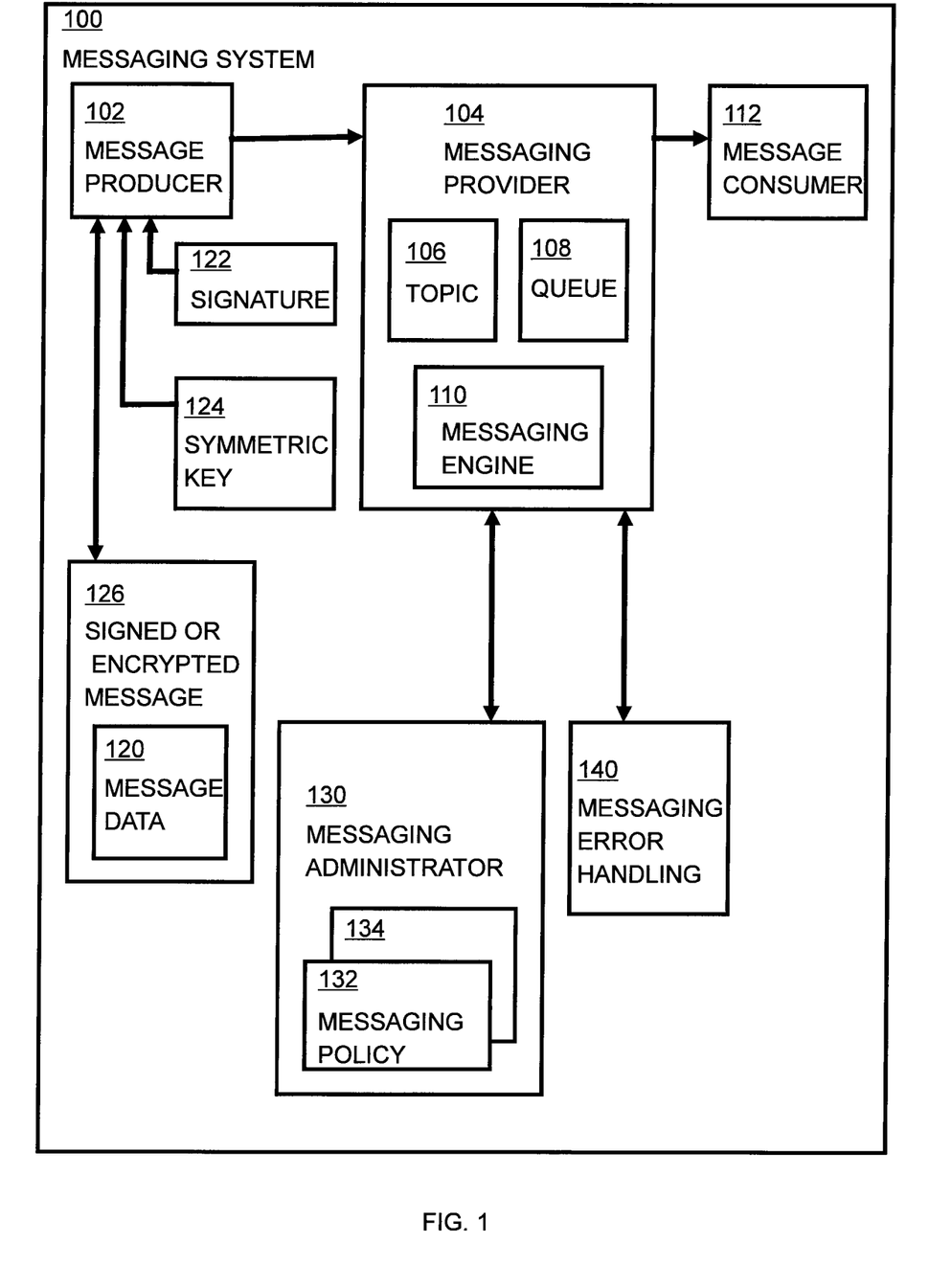
FIG. 1 shows a messaging system in which embodiments of managing messages in a messaging system may be implemented, in accordance with one or more aspects of the present invention.

FIG. 1 shows a messaging system in which embodiments of managing messages in a messaging system are implemented. Messaging system 100 comprises one or more message producers 102 which send messages to be published or to be put on a queue for later retrieval to a messaging provider 104. Messaging provider 104 publishes the message in a topic 106 or puts the message to a queue 108. Messaging provider 104 comprises a messaging engine 110 which carries out the functionality associated with messaging provider 104. Message consumer 112 reads messages from topic 106. Messaging provider 104 puts messages from queue 108 to messaging consumer 112.

Message data 120 is created by message producer 102 and is either signed using signature 122 to create a signed message 126 or is encrypted using symmetric key 124 to create encrypted message 126. In an embodiment, message data 120 may be both signed using signature 122 and encrypted using symmetric key 124 to create a signed and encrypted message 126. In an embodiment, signature 122 may be a signature conforming to cryptographic message syntax standard PKCS #7. In an embodiment, symmetric key 124 may be a symmetric key conforming to cryptographic message syntax standard PKCS #7.

When a signature or a key is created, it typically has an expiry date associated with it. Once the expiry date is reached, the key is revoked and if an attempt is made by a message consumer 112 to use a revoked public key to authenticate a message signed by a message producer 102 with a corresponding private key, the attempt will fail, even if the message was signed by the message producer 102 with the private key when it was valid and not revoked. If an attempt by a message consumer 112 to use a revoked private key to decrypt a message encrypted by a message producer 102 with a corresponding public key, the attempt will fail, even if the message was encrypted by the message producer 102 with the public key when it was valid and not revoked. Before checking whether the signature 122 is valid, the message consumer 112 will need to have decrypted the message.

Messaging administrator 130 configures data in one or more messaging policies 132, 134. Messaging policies 132, 134 are applied to each message by the message producer 102. Messaging policies 132, 134 comprise directives associated with the privacy and integrity of messages. Messaging policies 132, 134 will be described in more detail below with reference to FIG. 4. Message error handling 140 handles errors resulting from the processing of messages by the messaging provider 104.

Figure 2:
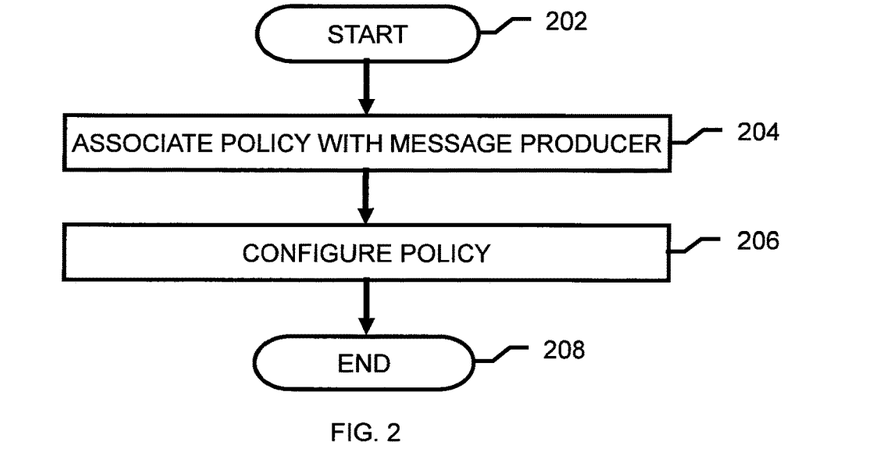
FIG. 2 shows a flowchart of an embodiment of a method of initialization of a messaging policy with the messaging system of FIG. 1, in accordance with one or more aspects of the present invention.

FIG. 2 shows a flowchart of an embodiment of a method of initialization of the messaging policy of FIG. 1. Embodiments of the method of initializing the messaging policy start at step 202. At step 204, the messaging policy 132, 134 is associated with the message producer 102, being identified by, for example, by the name of the messaging policy 132, 134 matching the name of a queue 108 or a topic 106 that the messaging producer 102 is putting the message to or is publishing it to, that is, sending the message to. Other ways of identifying which messaging policy is to be associated with message producer 102 will be familiar to persons skilled in the art. The policy will be applied to message produced by the message producer 102, the policy comprising configuration data that determines when said message should be expired.

At step 206, the messaging policy 132, 134 is configured. The configuration may include adding directives associated with the privacy or integrity of messages, such as requiring that all messages are signed by the message producer 102 using signature 122 or that all messages are encrypted by message producer 102 using symmetric key 124. Step 206 of configuring the messaging policy 132, 134 and step 204 of associating the messaging policy 132, 134 with a messaging producer 102 may be carried out in any order. In an embodiment, a messaging policy 132, 134 may be associated with a message producer 102 and then configured or reconfigured. In another embodiment, a messaging policy 132, 134 may be configured and may then be associated with a message producer after being configured. The method ends at step 208.

Figure 3:
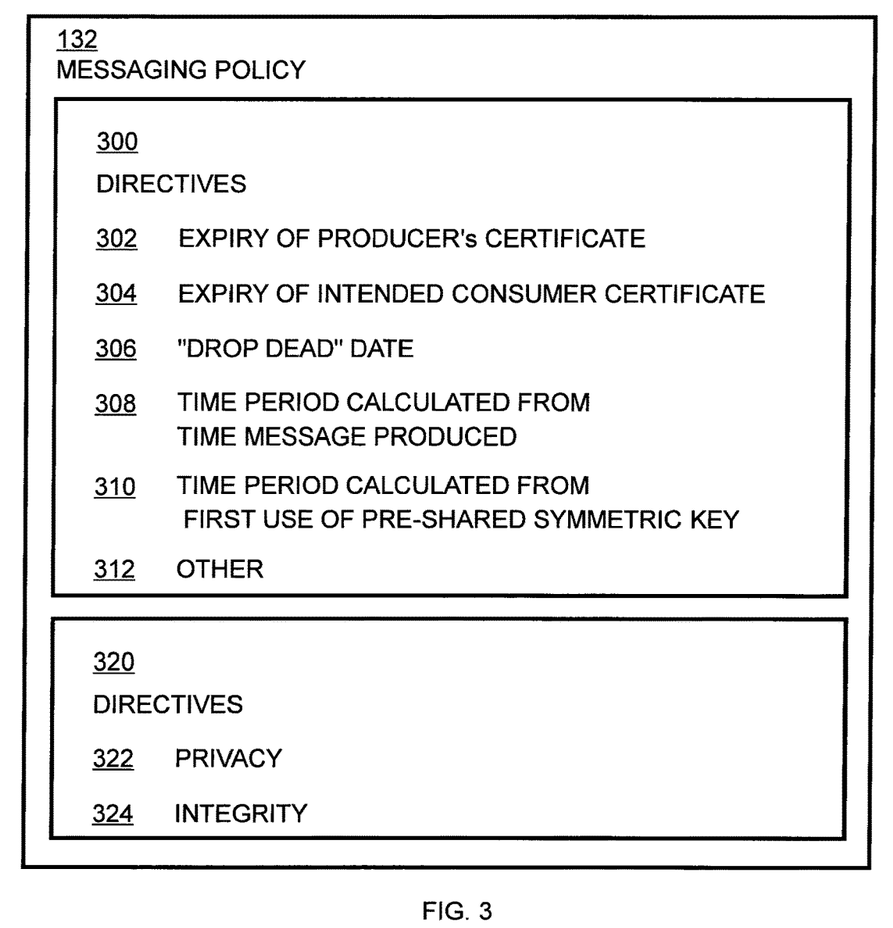
FIG. 3 shows a messaging policy suitable for use in the messaging system of FIG. 1, in accordance with one or more aspects of the present invention.

FIG. 3 shows a messaging policy 132 suitable for use in the messaging system 100 of FIG. 1. Messaging policy 132 uses directives 300 to control how message producers 102 and message consumers 112 securely exchange messages, the directives 300 including whether messages must be digitally signed using signature 122 or encrypted using symmetric key 124. Messaging policy 132 may be expanded to control the lifecycle of the message data based on a number factors explained below with reference to the directives 300 in the messaging policy. Messaging policy 132 comprises prior art directives 320 which define the privacy 322 or integrity 324 of messages. Messaging policy 132 also comprises directives 300 according to embodiments of the present invention which define the expiry of messages.

Directive 302 determines expiry of the message producer's 102 signature 122 used when signing message data 120 to produce signed message 126. An example of such a directive is:
setmqspl -m QMGR -p MY.PROTECTED.QUEUE -s SHA256 -e AES128 -r "CN=Bob, O=IBM, C=GB" -x SIGNER_CERT_EXPIRY
"setmqpsl" is a control command used in IBM's WebSphere MQ product to set security policies. Embodiments of the invention may use any other command that sets a security policy in any other product. "-m QMGR" indicates that the command applies to a queue manager name of "QMGR". "-p MY.PROTECTED.QUEUE" indicates that the command applies to the policy named "MY.PROTECTED.QUEUE". "-s SHA256" indicates that the digital signature algorithm to be used in the "SHA256" algorithm. "-e AES128" indicates that the digital encryption algorithm to be used in the "AES128" algorithm. "-r "CN=Bob, O=IBM, C=GB"" indicates that the message recipient's distinguished name is "CN=Bob, O=IBM, C=GB". The certificate of a distinguished name is used to encrypt a given message. "-x SIGNER_CERT_EXPIRY" indicates that the signer's certificate expiry is to be used as the date and time to expire the message. The configuration which embodiments of the present invention utilize comprises this expiry of the message producer's certificate if the message data is signed.

Directive 304 determines expiry of the message producer's 102 symmetric key 124 used when encrypting message data 120 to produce encrypted message 126. An example of such a directive is:
setmqspl -m QMGR -p MY.PROTECTED.QUEUE -s SHA256 -e AES128 -r "CN=Bob, O=IBM, C=GB" -x RECIPIENT_CERT_EXPIRY
"-x RECIPIENT_CERT_EXPIRY" indicates that the recipient's certificate expiry is to be used as the date and time to expire the message. The configuration which embodiments of the present invention utilise comprises this expiry of the message consumer's certificate if encrypting the message data.

Directive 306 determines a fixed "drop dead" date of a message configured by the messaging administrator 130. An example of such a directive is:
setmqspl -m QMGR -p MY.PROTECTED.QUEUE -s SHA256 -e AES128 -r "CN=Bob, O=IBM, C=GB" -x00: 00:01 05/12/2015
"-x 00:00:01 05/12/2015" indicates that the identified time and/or date is to be used as the date and time to expire the message. The configuration which embodiments of the present invention utilise comprises this fixed "drop dead" date configured by a messaging administrator.

Directive 308 determines a time period calculated from the time that the message was produced by the message producer 102. An example of such a directive is:
setmqspl -m QMGR -p MY.PROTECTED.QUEUE -s SHA256 -e AES128 -r "CN=Bob, O=IBM, C=GB" -x+6000s
"-x+6000s" indicates that the date and time to expire the message is to be 6000 seconds from the time that the message was put or published. The configuration which embodiments of the present invention utilise comprises a time period calculated from the time said message was produced.

Directive 310 determines a time period calculated from the first use of a pre-shared symmetric key 124. An example of such a directive is:
setmqspl -m QMGR -p MY.PROTECTED.QUEUE -e AES128 -t PSK -x+6000s
"-t PSK" indicates that a policy associated with a queue is to use a pre-shared key. The date and time to expire the message is to be 6000 seconds from the time that the pre-shared key was first used. The configuration which embodiments of the present invention utilise comprises a time period calculated from the first use of a pre-shared symmetric key.

All of the above directives are exemplary only and are not intended to limit the details of the directive or the format of the directives. For example, "setmqpsl" is a control command used in IBM's WebSphere MQ product to set security policies, but other control commands used in other messages systems may be equally used in other embodiments of the invention.

Figure 4:
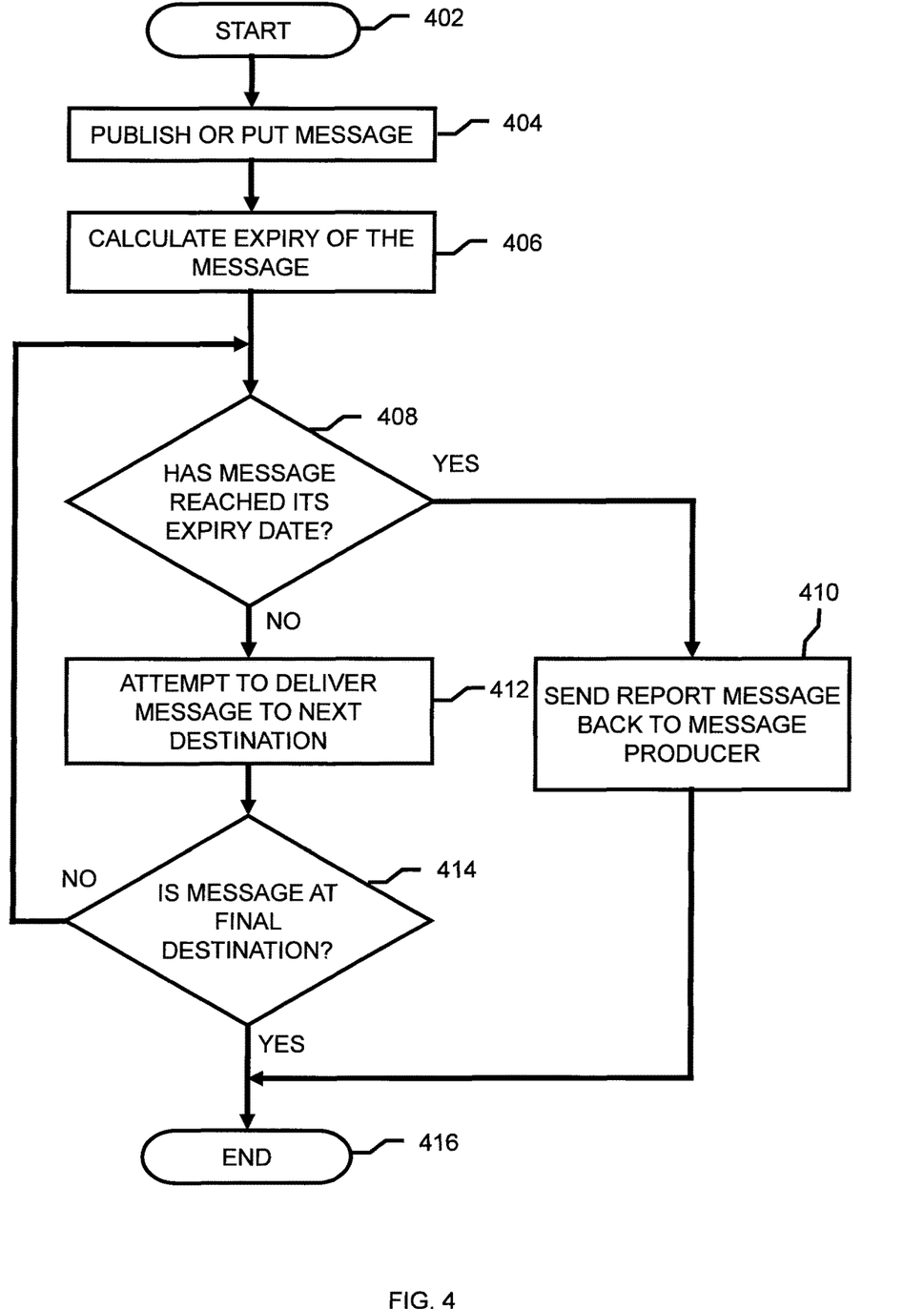
FIG. 4 shows a flowchart of one embodiment of a method of managing messages in the system of FIG. 1 using a messaging policy in which messages are pushed by a message producer, in accordance with one or more aspects of the present invention.

FIG. 4 shows a flowchart of a first embodiment of a method of managing messages in the messaging system of FIG. 1 using the messaging policy in which messages are pushed by a message producer 102. The messages are produced by a message producer 102 for delivery to a message consumer 112. The method starts at step 402. At step 404, a message is published by the message producer 102 to a topic 106 in the messaging provider 104 or to a queue 108 in the messaging provider 104. This is done by sending the message from the message producer 104 to the messaging provider 104.

At step 406, the configuration data from the messaging policy 132, 134 associated with the message producer 102 for that message is used by messaging provider 104 to calculate the expiry of the message. The calculated expiry for the message is passed to the messaging engine 110 in the messaging provider 104. In another embodiment, the expiry of the message may be calculated by the messaging engine 110. In this embodiment, either the message is not encrypted or the messaging engine 110 must decrypt it.

At step 408, a check is made by the messaging engine 110 to determine whether the message has reached its expiry; that is, whether the calculated expiry of the message has been reached. As the expiry has been calculated by the messaging provider 104 based on configuration data from the messaging policy 132, 134, then the expiry can be determined without having to decrypt the data in the message if it is encrypted. If message expiry has been reached, then processing continues to step 410. If the message has not reached its expiry, then processing continues to step 412 where an attempt is made by the messaging engine 110 to deliver the message to the next destination for the message.

At step 410, responsive to the message expiry being reached, a report message is sent by messaging error handling 140 to the message producer 102. The message consumer 112 does not have to handle any errors associated with an invalid signature caused by a signature 122 which has expired. Additionally, the report message provides feedback to the message producer 102 that messages are not being processed by the messaging provider 104 in a timely manner. If the message was an encrypted message 126, then copies of any message data 120 that was encrypted with the expired symmetric key 124 may be deleted. In an embodiment, a report message is sent by messaging error handling 140 to the message consumer 112. The message consumer 112 is then aware that a message was to be sent to it, but will now not be received by it as the message has expired. In another embodiment, report messages are sent by message error handling 140 to both the message producer 102 and the message consumer 112. The method ends at step 416.

At step 412, the messaging engine 110 attempts to deliver the message to the next destination. At step 414, a check is made by the messaging engine 110 to determine if the message is at its final destination. If the message is at its final destination, then processing proceeds to step 416 and the method ends at step 416. If the message is not at its final destination, then processing returns to step 408.

In an embodiment, at step 412, the message consumer 112 pulls messages from the messaging provider 104. The check at step 414 is still made by the messaging engine 110.

Figure 5:
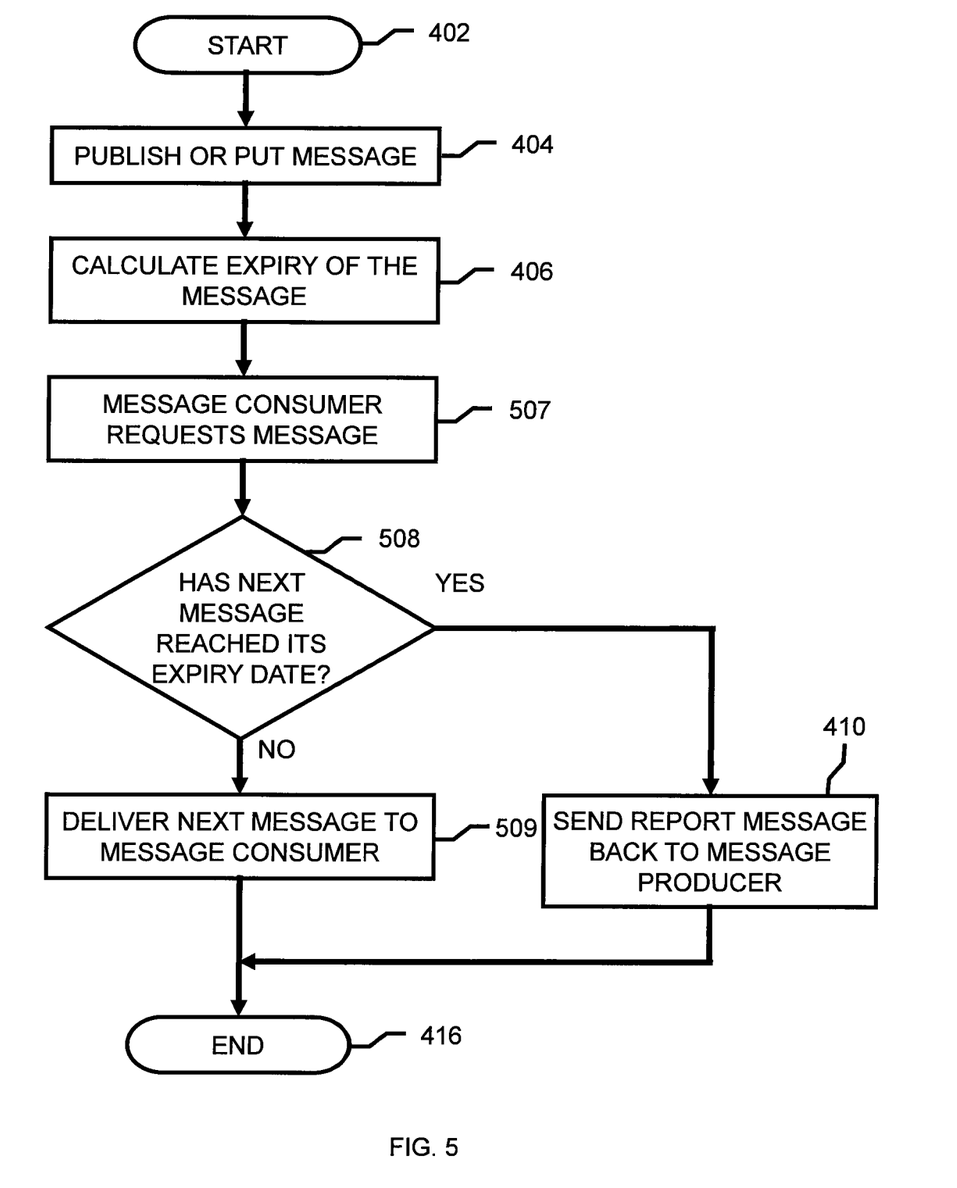
FIG. 5 shows a flowchart of another embodiment of a method of managing messages in the system of FIG. 1 using a messaging policy in which messages are pulled by a message consumer, in accordance with one or more aspects of the present invention.

FIG. 5 shows a flowchart of a second embodiment of a method of managing messages in the system of FIG. 1 using the messaging policy in which messages are pulled by a message consumer 112. Steps 402 to 406, 410 and 416 all correspond to the steps having the same reference numerals in FIG. 4. The method starts at step 402. At step 404, a message is published by the message producer 102 to a topic 106 in the messaging provider 104. At step 406, the configuration data from the messaging policy 132, 134 associated with the message producer 102 for that message is used by messaging provider 104 to calculate the expiry of the message. The calculated expiry for the message is passed to the messaging engine 110. In another embodiment, the expiry of the message may be calculated by the messaging engine 110. In this embodiment, either the message is not encrypted or the messaging engine 110 must decrypt it. At step 507, the message consumer 112 requests a message from the messaging provider 104.

At step 508, a check is made by the messaging engine 110 to determine whether the next message has reached its expiry. As the expiry has been calculated by the messaging provider 104 based on configuration data from the messaging policy 132, 134, then the expiry can be determined without having to decrypt the data in the message if it is encrypted. If the next message has reached its expiry date, then processing continues to step 410. If the next message has not reached its expiry date, then at step 509, where the messaging engine 110 delivers the next message to the message consumer 112. The method ends at step 416.

At step 410, responsive to the message expiry being reached, a report message is sent by messaging error handling 140 to the message producer 102. The message consumer 112 does not have to handle any errors associated with an invalid signature 122 caused by a signature 122 which has expired. Additionally, the report message provides feedback to the message producer 102 that messages are not being processed by the messaging provider 104 in a timely manner. If the message was an encrypted message 126, then copies of any message data 120 that was encrypted with the expired symmetric key 124 may be deleted. In an embodiment, a report message is sent by messaging error handling 140 to the message consumer 112. The message consumer 112 is then aware that a message was to be sent to it, but will now not be received by it as the message has expired. In another embodiment, report messages are sent by message error handling 140 to both the message producer 102 and the message consumer 112. The method ends at step 416.

Referring back to FIG. 1, the message producer 102 identifies a policy 132, 134 to be used and applies the policy 132, 134 to the message, the policy 132, 134 comprising configuration data that determines when the message should be deleted, the message intended for delivery to a message consumer 112 and which sends the message to the said messaging provider 104, and the messaging provider 104 uses the configuration data to calculate the expiry of the message, determines whether the calculated expiry of the message has been reached, responsive to the expiry of the message being reached, sends a report message to the message producer 102 and responsive to the expiry of the message not being reached, attempts to deliver the message to the message consumer 112.

Figure 6:
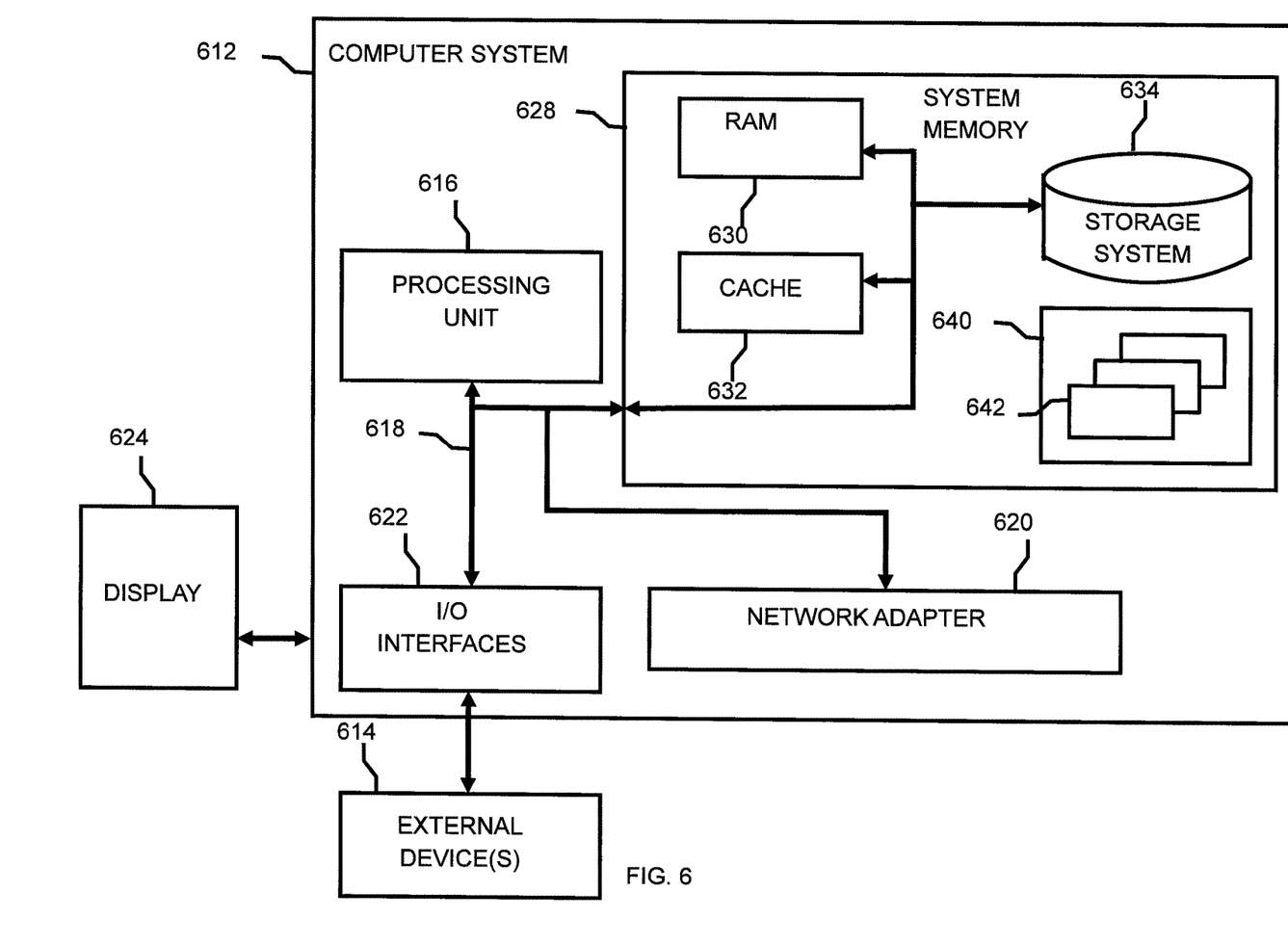
FIG. 6 shows a computer system according to an embodiment of the present invention.

Referring now to FIG. 6, a schematic of an example of computing system is shown. Computing system 612 is only one example of a suitable computing system and is not intended to suggest any limitation as to the scope of use or functionality of embodiments of the invention described herein. Regardless, computing system 612 is capable of being implemented and/or performing any of the functionality set forth hereinabove.

Computer system/server 612 is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing messages in a messaging system, messages being produced by a message producing resource for delivery to a message consuming resource, the method comprising:

identifying, by one or more processors of one or more computing resources configured to obtain messages from one or more message producing resources and to provide messages to one or more message consuming resources, a policy associated with the message producing resource, wherein the message producing resource comprises a resource of the one or more message producing resources, the policy comprising configuration data indicating when each message produced by the message producing resource should be expired and that each message encrypted by the message producing resource can be decrypted with a pre-shared symmetric key, wherein an expired message is invalid and is not delivered by the one or more processors;

sharing, by the message producing resource, with the one or more message consuming resources, the pre-shared symmetric key;

obtaining, by the one or more processors, from the message producing resource, an encrypted message destined for delivery to the message consuming resource, wherein the message consuming resource comprises a resource of the one or more message consuming resources, in the messaging system, wherein the encrypted message comprises data encrypted with the pre-shared symmetric key by the message producing resource, and wherein the pre-shared symmetric key is accessible to the message producing resource;

determining, by the one or more processors, the expiry of the encrypted message by applying the policy to the encrypted message without decrypting data in the encrypted message, wherein the policy comprises a directive to calculate the expiry date of the encrypted message based on a first use of the pre-shared symmetric key, wherein the directive comprises the first use of the pre-shared symmetric key and the time period from the first use at which the expiry date of the encrypted message is reached, wherein applying the policy comprises:

accessing the identified configuration data to obtain the directive; and based on obtaining the directive, calculating a time period from a first use of the pre-shared symmetric key;

determining, by the one or more processors, based on whether the calculated time period from a first use of the pre-shared symmetric key is greater than or equal to the time period from the first use at which the expiry date of the encrypted message is reached, based on the directive, whether the expiry of the encrypted message has been reached;

responsive to determining that the expiry of the encrypted message was reached:

sending, by the one or more processors, a report message to the message producing resource;

sending, by the one or more processors, an error message, instead of the encrypted message, to the message consuming resource; and deleting, by the one or more processors, the data encrypted with the pre-shared symmetric key; and responsive to determining that the expiry of the encrypted message has not been reached:

transmitting, by the one or more processors, the encrypted message to the message consuming resource, wherein the consumer decrypts the message utilizing the pre-shared symmetric key.

2. The method of claim 1, wherein the obtaining comprises determining that the encrypted message is destined for delivery to the message consumer resource via a queue or a topic in the messaging system, and the identifying the policy associated with the message producing resource comprises identifying a policy name matching the name of the queue or the name of the topic.

3. The method of claim 1, wherein the encrypted message was signed by the message producing resource and the configuration data comprises the expiry of a certificate of the message producing resource.

4. A messaging system for handling messages produced by a message producing resource for delivery to a message consuming resource, comprising:
a memory; and
one or more processors of one or more computing resources configured to obtain messages from one or more message producing resources and to provide messages to one or more message consuming resources in communication with the memory, wherein messaging system is configured to perform a method, the method comprising:
identifying, by the one or more processors of one or more computing resources configured to obtain messages from one or more message producing resources and to provide messages to one or more message consuming resources, a policy associated with the message producing resource, wherein the message producing resource comprises a resource of the one or more message producing resources, the policy comprising configuration data indicating when each message produced by the message producing resource should be expired and that each message encrypted by the message producing resource can be decrypted with a pre-shared symmetric key, wherein an expired message is invalid and is not delivered by the one or more processors;
sharing, by the message producing resource, with the one or more message consuming resources, the pre-shared symmetric key;
obtaining, by the one or more processors, from the message producing resource, an encrypted message destined for delivery to the message consuming resource, wherein the message consuming resource comprises a resource of the one or more message consuming resources, in the messaging system, wherein the encrypted message comprises data encrypted with the pre-shared symmetric key by the message producing resource, and wherein the pre-shared symmetric key is accessible to the message producing resource;
determining, by the one or more processors, the expiry of the encrypted message by applying the policy to the encrypted message without decrypting data in the encrypted message, wherein the policy comprises a directive to calculate the expiry date of the encrypted message based on a first use of the pre-shared symmetric key, wherein the directive comprises the first use of the pre-shared symmetric key and the time period from the first use at which the expiry date of the encrypted message is reached, wherein applying the policy comprises:
accessing the identified configuration data to obtain the directive; and
based on obtaining the directive, calculating a time period from a first use of the pre-shared symmetric key;
determining, by the one or more processors, based on whether the calculated time period from a first use of the pre-shared symmetric key is greater than or equal to the time period from the first use at which the expiry date of the encrypted message is reached, based on the directive, whether the expiry of the encrypted message has been reached;
responsive to determining that the expiry of the encrypted message was reached:
sending, by the one or more processors, a report message to the message producing resource;
sending, by the one or more processors, an error message, instead of the encrypted message, to the message consuming resource; and
deleting, by the one or more processors, the data encrypted with the pre-shared symmetric key; and
responsive to determining that the expiry of the encrypted message has not been reached:
transmitting, by the one or more processors, the encrypted message to the message consuming resource, wherein the consumer decrypts the message utilizing the pre-shared symmetric key.

5. The system of claim 4, wherein transmitting the encrypted message to the message consuming resource, is responsive to a request from the message consuming resource.

6. The system of claim 4, wherein the obtaining comprises determining that the encrypted message is destined for delivery to the message consuming resource via a queue or a topic in the messaging system, and the identifying the policy is based on a policy name matching a name the queue or a name of the topic.

7. The system of claim 4, wherein the encrypted message was signed by the message producing resource and the configuration data comprises the expiry of a certificate of the message producing resource.

8. A computer program product for managing messages in a messaging system produced by a message producing resource for delivery to a message consuming resource, the computer program product comprising:
a computer readable storage medium having program instructions embodied therewith, the program instructions executable by a computer to cause the computer to:
identify, by one or more processors of one or more computing resources configured to obtain messages from one or more message producing resources and to provide messages to one or more message consuming resources, a policy associated with the message producing resource, wherein the message producing resource comprises a resource of the one or more message producing resources, the policy comprising configuration data indicating when each message produced by the message producing resource should be expired and that each message encrypted by the message producing resource can be decrypted with a pre-shared symmetric key, wherein an expired message is invalid and is not delivered by the one or more processors;
share, by the message producing resource, with the one or more message consuming resources, the pre-shared symmetric key;
obtain, by the one or more processors, from the message producing resource, an encrypted message, destined for delivery to the message consuming resource, wherein the message consuming resource comprises a resource of the one or more message consuming resources, in the messaging system wherein the encrypted message comprises data encrypted with the pre-shared symmetric key by the message producing resource, and wherein the pre-shared symmetric key is accessible to the message producing resource;

determine, by the one or more processors, the expiry of the encrypted message by applying the policy to the encrypted message without decrypting data in the encrypted message, wherein the policy comprises a directive to calculate the expiry date of the encrypted message based on a first use of the pre-shared symmetric key, wherein the directive comprises the first use of the pre-shared symmetric key and the time period from the first use at which the expiry date of the encrypted message is reached, wherein applying the policy comprises:
- accessing the identified configuration data to obtain the directive; and
- based on obtaining the directive, calculating a time period from a first use of the pre-shared symmetric key;

determine, by the one or more processors, based on whether the calculated time period from a first use of the pre-shared symmetric key is greater than or equal to the time period from the first use at which the expiry date of the encrypted message is reached, based on the directive, whether the expiry of the encrypted message has been reached;

responsive to determining that the expiry of the encrypted message was reached:
- send, by the one or more processors, a report message to the message producing resource;
- send, by the one or more processors, an error message, instead of the encrypted message, to the message consuming resource; and
- delete, by the one or more processors, the data encrypted with the pre-shared symmetric key; and responsive to determining that the expiry of the encrypted message has not been reached:
transmit, by the one or more processors, the encrypted message to the message consuming resource, wherein the consumer decrypts the message utilizing the pre-shared symmetric key.

9. The computer program product of claim 8, wherein the obtaining comprises determining that the encrypted message is destined for delivery to the message consuming resource via a queue or a topic in the messaging system, and the identifying icy associated with the message producing resource comprises identifying a policy name matching the name of the queue or the name of the topic.

10. The computer program product of claim 8, wherein the encrypted message was signed by the message producer and the configuration data comprises the expiry of a certificate of the message producing resource.

\* \* \* \* \*